Oct. 12, 1965 R. M. DENNING ETAL 3,211,401
AIRCRAFT AND ENGINE ARRANGEMENT
Filed July 7, 1964 2 Sheets-Sheet 1
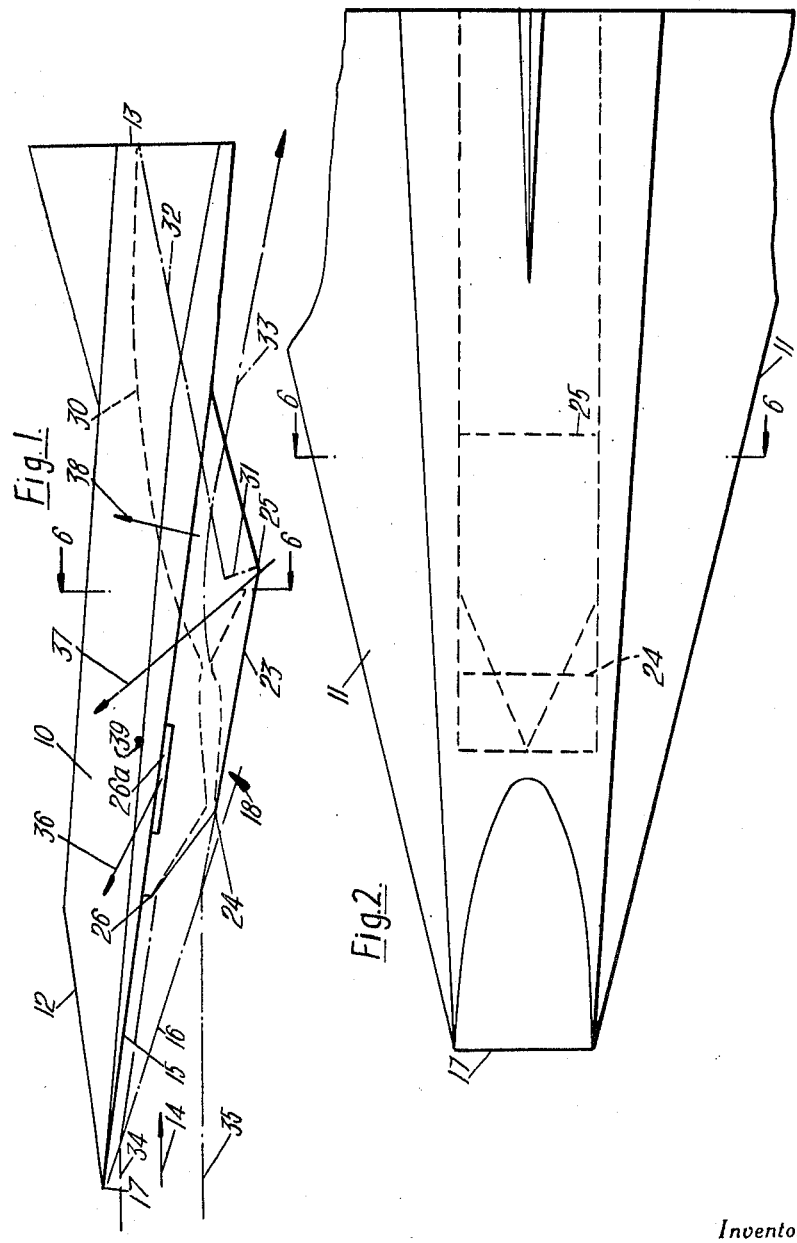
Inventor
RALPH MURCH DENNING
RAYMOND JOHN LANE
By Baileys Stephens &
Huettig
Attorney Oct. 12, 1965    R. M. DENNING ETAL    3,211,401
AIRCRAFT AND ENGINE ARRANGEMENT
Filed July 7, 1964    2 Sheets-Sheet 2
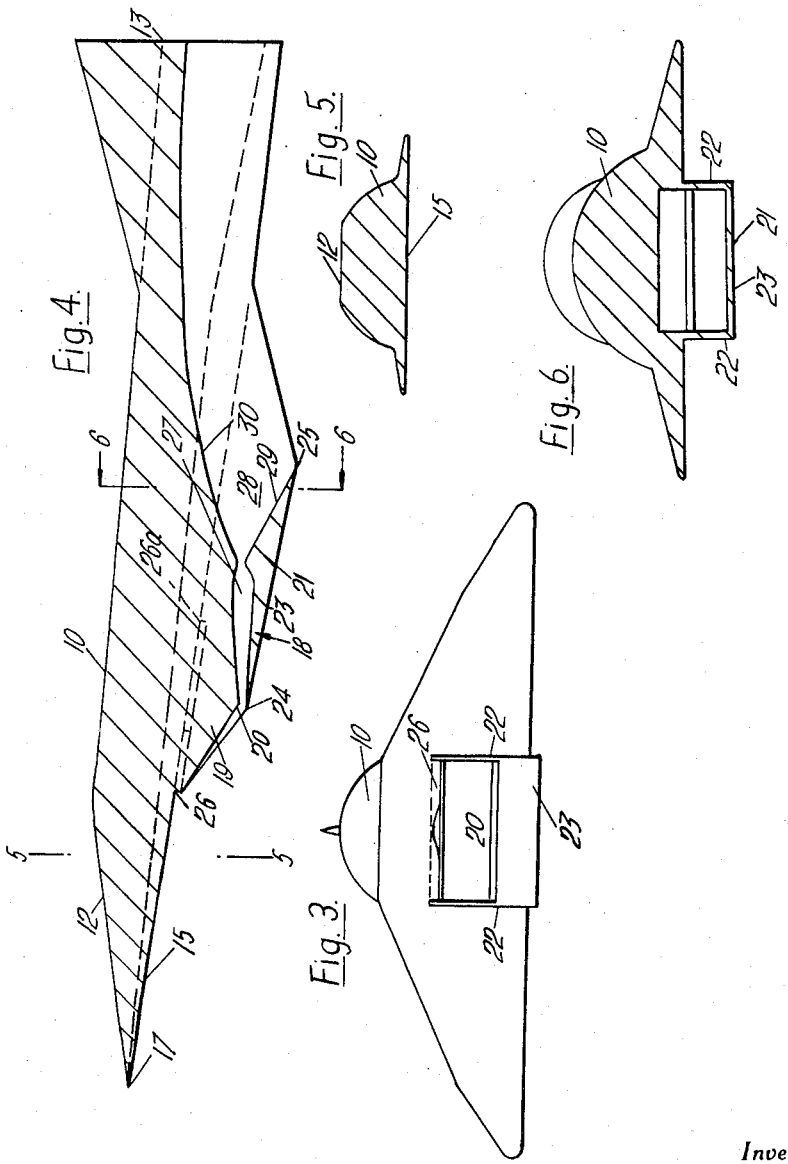
Inventor
RALPH MURCH DENNING
RAYMOND JOHN LANE
By Bailey, Stephens
    Huettig
    Attorney United States Patent Office 3,211,401
Patented Oct. 12, 1965

3,211,401
AIRCRAFT AND ENGINE ARRANGEMENT
Ralph Murch Denning and Raymond John Lane, both of Bristol, England, assignors to Bristol Siddeley Engines Limited, Bristol, England, a British company
Filed July 7, 1964, Ser. No. 380,817
Claims priority, application Great Britain, July 9, 1963, 27,153/63
3 Claims. (Cl. 244—53)

The invention relates to aircraft intended to fly at multisonic speeds, of the kind comprising parts having primary lifting surfaces whose primary function is to generate aerodynamic lift, which surfaces are arranged at an angle of incidence to the direction of flight of the aircraft at its cruising speed, and an air-breathing jet propulsion engine having an air intake and a propulsion nozzle, the air intake being defined between an underneath surface of the aircraft and a lip constituted by the leading edge part of an engine housing which projects below the said underneath surface.

In such aircraft, due to the multisonic flight speed, and especially when a subsonic velocity combustion system is used for heating the air breathed by the engine, the propulsion nozzle has to include a divergent part with a large expansion ratio, and difficulties occur in accommodating such a nozzle without incurring a drag penalty due to an increase in the projected frontal area of the aircraft.

According to the present invention an aircraft comprises parts having primary lifting surfaces whose primary function is to generate aerodynamic lift, which surfaces are arranged at an angle of incidence to the direction of flight of the aircraft at its designed cruising speed, and an air-breathing jet propulsion engine having a propulsion nozzle and an air intake defined between an underneath surface of the aircraft and an intake lip, and an engine housing projecting below said underneath surface of the aircraft and being provided with an undersurface which extends from its leading edge, which constitutes said intake lip, to its trailing edge which forms a propulsion nozzle lip, said undersurface being inclined at an angle of incidence which exceeds the angle of incidence of said primary lifting surfaces by an amount of the order of 2 to 3 degrees, whereby at the designed cruising speed of the aircraft the ratio of lift to induced drag of said undersurface is substantially equal to the ratio of lift to total drag of said primary lifting surfaces, as explained below.

The lift contributed by the undersurface of the engine housing permits the primary lifting surfaces to be designed for a correspondingly reduced lift, and the condition that the lift to induced drag ratio of the engine housing undersurface, which in practice is substantially equal to the cotangent of its angle of incidence to the free airstream, is equal to the ratio of the lift to total drag of the primary lifting surfaces defines how far the incidence of the surface can be increased, thereby allowing a nozzle of larger effective exit area to be accommodated, without incurring a drag penalty.

The limiting condition is arrived at by the following reasoning, but it must first be made clear that some tolerance must be allowed in the practical application of the theory since it is not possible to define exactly in any convenient manner which surfaces of an aircraft are "lifting surfaces" and which are not. Even in the case of a conventional aircraft consisting of a body and more or less discrete wings, in which it might appear obvious where the body ends and the wings begin, it has to be borne in mind that the body can generate some lift and in this respect have the same function as the wings, and the wings can carry fuel and thus perform the same load-carrying function as the body. In the case of aircraft which do not have separately identifiable wings, the distinction between lifting and non-lifting surfaces is of course even less clear. As a result, for the present purpose it is necessary to be satisfied with the definition that the primary lifting surfaces are those surfaces which have been incorporated into the aircraft primarily for the purpose of generating aerodynamic lift.

Consider first the case of an aircraft powered by an engine in a housing which projects below an underneath surface of the aircraft and is designed so that the undersurface of the housing is parallel to the line which the aircraft underneath surface would take in the absence of the engine housing, the design of the aircraft and its lifting surfaces having been carefully optimised so as to achieve the required amount of lift with the minimum drag penalty. Suppose then that the possibility of increasing the incidence of the housing undersurface is conceived with a view to increasing the depth available at its rear end for accommodation of the propulsion nozzle, then clearly, because some lift, or some additional lift is generated by the housing undersurface, it is possible, keeping the total lift of the aircraft constant, to reduce the amount of lift generated by the lifting surfaces. Assuming that the reduction is effected by a modification which does not change their incidence (for example by a change of area) this will cause a reduction in the drag due to the lifting surfaces ($\Delta D_{LS}$) by an amount given by the equation:

$$\Delta D_{LS} = \frac{\Delta L_{HS}}{L_{LS}/D_{LS}^{(total)}} \quad (1)$$

Where:
$\Delta L_{HS}$ is the change of housing surface lift,
$L_{LS}$ is the lifting surface lift,
$D_{LS}^{(total)}$ is the total drag of the lifting surfaces i.e. the induced drag plus the skin friction and wave-making drags.

In order to maintain the original values of aircraft lift and drag (thus keeping the aircraft in its optimised condition) the reduction is drag achieved by modifying the geometry of the lifting surfaces, $\Delta D_{LS}$, must equal the drag incurred by changing the incidence of the housing surface, which however will be due only to an increase in the induced drag of the surface, i.e. excluding skin friction and wave drag, so that $$\Delta D_{LS} = \Delta D_{HS}^{(induced)} \quad (2)$$

From (1) and (2)

$$\frac{L_{LS}}{D_{LS}^{(total)}} = \frac{\Delta L_{HS}}{\Delta D_{HS}^{(induced)}}$$

and for small angles of housing surface incidence such as are involved in the present argument $$\frac{\Delta L_{HS}}{\Delta D_{HS}^{(induced)}} \text{ approximately equals } \frac{L_{HS}}{D_{HS}^{(induced)}}$$

so that $$\frac{L_{HS}}{D_{HS}^{(induced)}} \simeq \frac{\text{lifting surface lift}}{\text{lifting surface induced drag} + \text{skin friction} + \text{wave drag}}$$

Since the ratio of the lift to the induced drag of an inclined surface is approximately equal to the cotangent of the angle of incidence of the surface, it follows that the angle of incidence of the engine undersurface will be greater than that of the lifting surfaces. In practice the difference is small, of the order of two degrees, but is nevertheless significant in the multisonic flight speed region.

According to a further feature of the invention, the propulsion nozzle has a divergent portion defined between a lower surface extending forwards from the propulsion nozzle lip and an upper surface passing upwards through an underneath, primary lifting surface of the aircraft, the configuration of the nozzle being such that the resultant thrust from the nozzle is inclined upwards at an angle slightly greater than the angle of inclination of the undersurface of the engine housing.

This arrangement of the nozzle further assists in allowing the required exit area to be obtained concomitantly with a positioning of the thrust vector, the intake momentum drag vector and the vector of the aerodynamic forces acting on the aircraft such that their resultant passes through a point suitably behind the centre of gravity of the aircraft to ensure stability in pitch.

The accompanying drawings illustrates one example of an aircraft according to the invention.

In the drawings:

FIGURE 1 is a side elevation,
FIGURE 2 is a plan view;
FIGURE 3 is a front view;
FIGURE 4 is a central longitudinal section;
FIGURE 5 is a tranverse section on the line 5—5 in FIGURE 4; and
FIGURE 6 is a transverse section on the line 6—6 in FIGURE 4.

The aircraft shown in the drawings comprises a body portion 10 of substantially segmental shape in transverse cross-section, as shown in FIGURES 5 and 6, with lateral wing projections 11 of triangular shape in plan view, as shown in FIGURE 2. The segmental body portion 10 increases in cross-section from a front sloping surface 12 to a rear surface 13 which is perpendicular to the relative free stream direction, indicated by an arrow 14 in FIGURE 1, which is opposite to the direction of flight. The underneath surfaces 15 of the body and wing portions are the primary lifting surfaces, whose primary function is to generate aerodynamic lift, and in this example they are inclined at an angle of incidence of 8° to the direction of flight. With this arrangement the ratio of lift to total drag of the wing portions at the designed cruising speed of Mach 7 is about 5.1.

In flight at the cruising speed an oblique shock wave 16 is generated extending rearwards and downwards from the part 17 of the leading edge of the underneath surfaces 15. Behind the shock wave 16 a ramjet engine is arranged in a housing 18 projecting below the underneath surfaces 15. The housing 18 includes an upper part 19 carrying an air intake ramp 20 and a lower part 21 with side cheeks 22 and a flat undersurface 23 extending from an air intake lip 24 to a propulsion nozzle lip 25. A gap 26 between the leading edge of the intake ramp 20 and the primary lifting surface 15 allows boundary layer air above a streamline 34 to be bled off, this air being discharged through openings 26a in the sides of the housing 18. The undersurface 23 is arranged at an angle of incidence of 11°, this being the angle whose cotangent 5.14, representing approximately its ratio of lift to induced drag, is about equal to the ratio of lift to total drag of the wing portions 11.

The air intake opening between the lip 24 and the ramp 20 leads to a combustion chamber 27 in which fuel is burnt in the air. The products of combustion discharge into a convergent-divergent propulsion nozzle 28, the divergent portion of which is defined between a lower surface 29 extending forwards from the lip 25, and a longer concavely curved upper surface 30 constituting a wall of an inverted channel which intersects the underneath lifting surface 15.

The nozzle expansion surfaces 29 and 30 are formed so that, in operation, a mean position streamline 33, after leaving the throat of the nozzle follows a slightly curved path during the expansion process, which terminates at lines 31 and 32 of constant Mach number, and has a final direction inclined downwards at an angle of about 12°. The resultant thrust of the nozzle will be opposite in direction to this streamline. The stream of air which enters the engine air intake is bounded on its upper side by the boundary layer streamline 34 and on its lower side by a streamline 35 which after refraction in passing through the shock wave 16 and a shock wave generated by the ramp 20, strikes the intake lip 24. The momentum of this airstream may be represented by a vector in the direction of the arrow 14, and that of the propulsion jet by a vector opposite to the final direction of the streamline 33. The sum of these vectors gives a forwardly and upwardly inclined resultant vector 36, and the intake and nozzle have to be positioned and arranged such that the resultant 37 of the vector 36 and of a vector 38 representing the aerodynamic lift and drag forces acting on the aircraft passes a suitable distance behind the centre of gravity 39 of the aircraft, to provide stability in pitch.

By making the undersurface 23 of the engine housing effective as a lifting surface with the maximum angle of incidence which is reasonably free from drag penalty, more space is made available for the engine and its discharge nozzle. Taking the upper expansion surface of the nozzle upwards through the primary lift-producing underneath surface 15 of the aircraft furthermore permits the position of the resultant thrust vector 36 to be adjusted in relation to the vector 38 representing the aerodynamic forces so that their resultant 37 passes through a point which is suitably placed behind the centre of gravity of the aircraft.

We claim:

1. An aircraft comprising parts having primary lifting surfaces whose primary function is to generate aerodynamic lift, which surfaces are arranged at an angle of incidence to the direction of light of the aircraft at its designed cruising speed, an air-breathing jet propulsion engine having a propulsion nozzle and an air intake defined between an underneath surface of the aircraft and an intake lip, and an engine housing projecting below said underneath surface of the aircraft and being provided with an undersurface which extends from its leading edge, which constitutes said intake lip, to its trailing edge which forms a propulsion nozzle lip, said undersurface being inclined at an angle of incidence which exceeds the angle of incidence of said primary lifting surfaces by an amount of the order of 2 to 3 degrees, whereby at the designed cruising speed of the aircraft the ratio of lift to induced drag of said undersurface is substantially equal to the ratio of lift to total drag of said primary lifting surfaces, the area, and consequent weight, of said primary lifting surfaces is minimised, the exit area of said propulsion nozzle is maximised and the specific fuel consumption of said engine is thereby minimised, the angular deflection of air flowing into said air intake is minimised, and the cruising range of said aircraft is maximised.

2. An aircraft according to claim 1 in which the propulsion nozzle has a divergent portion defined between a lower surface extending forwards from the propulsion nozzle lip and an upper surface constituting a wall of an inverted channel which intersects an underneath, primary lifting surface of the aircraft, the configuration of the nozzle being such that the resultant thrust from the nozzle is inclined upwards at an angle slightly greater than the angle of inclination of the undersurface of the engine housing.

3. An aircraft according to claim 2 in which the upper surface of the divergent portion of the propulsion nozzle is concavely curved.

References Cited by the Examiner

UNITED STATES PATENTS

| | | | |
|---|---|---|---|
| 2,944,765 | 7/60 | Lane et al. | 244—15 |
| 2,956,759 | 10/60 | Creasey et al. | 244—53 |
| 3,093,348 | 6/63 | Schelp et al. | 244—15 |
| 3,137,460 | 6/64 | Owl et al. | 244—53 |

FERGUS S. MIDDLETON, *Primary Examiner.*

MILTON BUCHLER, *Examiner.*